Dec. 12, 1967  S. E. HAGERTY  3,357,319
CUP SEAL CONSTRUCTION
Filed Oct. 22, 1965  2 Sheets-Sheet 1

INVENTOR.
SIDNEY E. HAGERTY
BY
Sheldon F. Rogers
ATTORNEY

Dec. 12, 1967   S. E. HAGERTY   3,357,319
CUP SEAL CONSTRUCTION

Filed Oct. 22, 1965   2 Sheets-Sheet 2

INVENTOR.
SIDNEY E. HAGERTY
BY
Sheldon F. Rogers
ATTORNEY

United States Patent Office 3,357,319
Patented Dec. 12, 1967

3,357,319
CUP SEAL CONSTRUCTION
Sidney E. Hagerty, Union, Mich., assignor to The Bendix Corporation, a corporation of Delaware
Filed Oct. 22, 1965, Ser. No. 501,664
3 Claims. (Cl. 92—245)

This invention relates to a cup seal for a fluid motor.

An object of this invention is to provide a fluid motor with a cup seal to prevent leakage.

A further object of the invention is to provide a cup seal for a fluid motor which not only acts as a seal but also has abutment means provided thereon which engages a stop and prevents engagement of the lip of the cup seal with the stop when the fluid actuator is thrust against the stop.

Cup type seals are not too satisfactory when constructed of diameters larger than approximately one and one-half inches. This is because the larger the diameter, the less support the lip gets from the base thereby increasing the tendency for the cup to bow. Accordingly it is another object of this invention to provide a cup seal which functions satisfactorily regardless of its diameter.

Yet another object of this invention is to provide a cup seal with a retainer member which prevents buckling or bowing of the cup seal and yet does not effect an appreciable increase of the frictional resistance to sliding between the lip of the cup seal and the wall of a bore that is present without the retainer member.

An overall object of the invention is to provide a seal which is subject to less leakage and more economically feasible than a standard annular lip seal.

Other objects of the invention will be apparent from the following description with reference to the drawings wherein.

Figure 1:
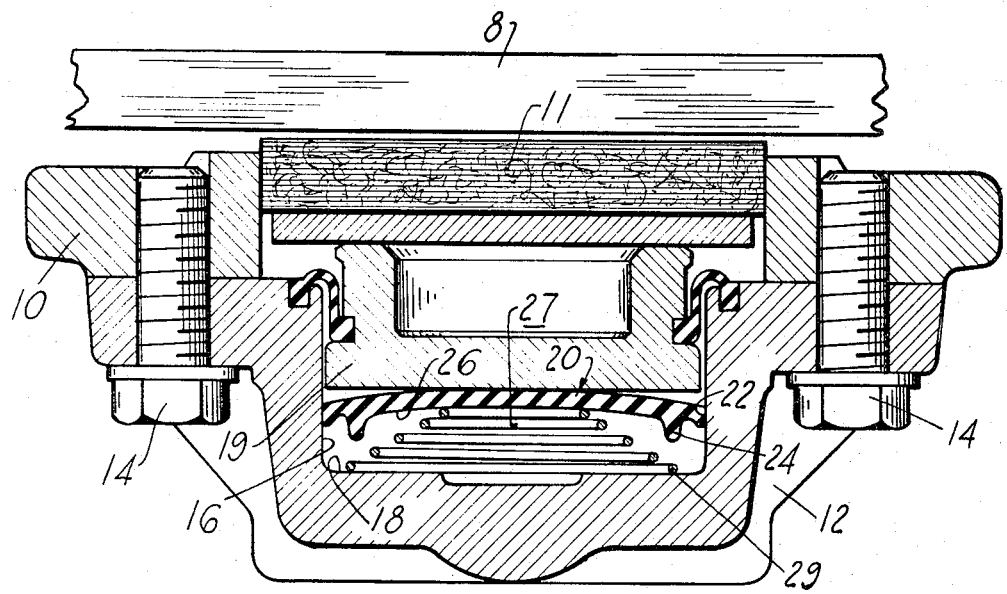
FIGURE 1 is a cross section view of a fluid actuator of a brake assembly.

Referring to FIGURE 1, only one-half of a well known stationary caliper and a disc 8 is illustrated with it being understood that the half of the caliper on the opposite side of the disc 8 is the same. A stationary stirrup 10 is secured to a fixed part of a vehicle (not shown) and has an opening therein slidably receiving a brake shoe 11. A cylinder housing 12 is secured by bolts 14 to the stirrup 10 and comprises a bore 16 open at its front end and closed at its rear end by a wall 18. A piston 19 is slidably disposed within the bore 16 and engages the shoe 11 for thrusting the same into engagement with the disc 8. A cup seal 20 is interposed between the rear wall 18 of the bore 16 and the piston 19. The cup seal 20 comprises an annular lip 22 which slidingly and sealingly engages the wall of the bore 16 and an annular abutment ring 24 which projects from the rear face 26 of the cup seal 20 in a rearward axial direction beyond the lip 22. A multi-diametered spring 27 is compressed between the cup seal 20 and the wall 16 to maintain the front face 31 in engagement with the piston 19 and to bias the piston forwards to maintain slight engagement of the shoe 11 with the disc 8 during brake release position. The annular abutment ring 24 is radially separated from the lip 22 by a groove 28 and extends beyond the lip 22 in order that upon rearward movement of the piston 19, the abutment 24 will either engage the coil 29 or the rear wall 18, depending upon the relative diameter of the ring 24 and the coil 29, to stop rearward movement of the piston and prevent the lip 22 from engaging the wall 18 or the spring 27.

It can be readily seen that lip 22 is rolled back when engaging the wall of the bore 16 resulting in having the central portion of the cup seal 20 leaving an annular peripheral space 21 between the rear face of the piston and the front face of the cup seal. This has a disadvantage that upon each brake application the space 21 between the cup seal and the piston will have to be filled with fluid to effect flush engagement between the cup seal 20 and the piston prior to movement of the piston in a brake applying direction. This would mean that fluid must be displaced resulting in brake pedal travel prior to applying brakes. One way of coping with the problem would be to machine the rear face of the piston to conform to the bow shape of the cup seal to provide flush engagement therebetween. However, this is a costly solution.

Figure 3:
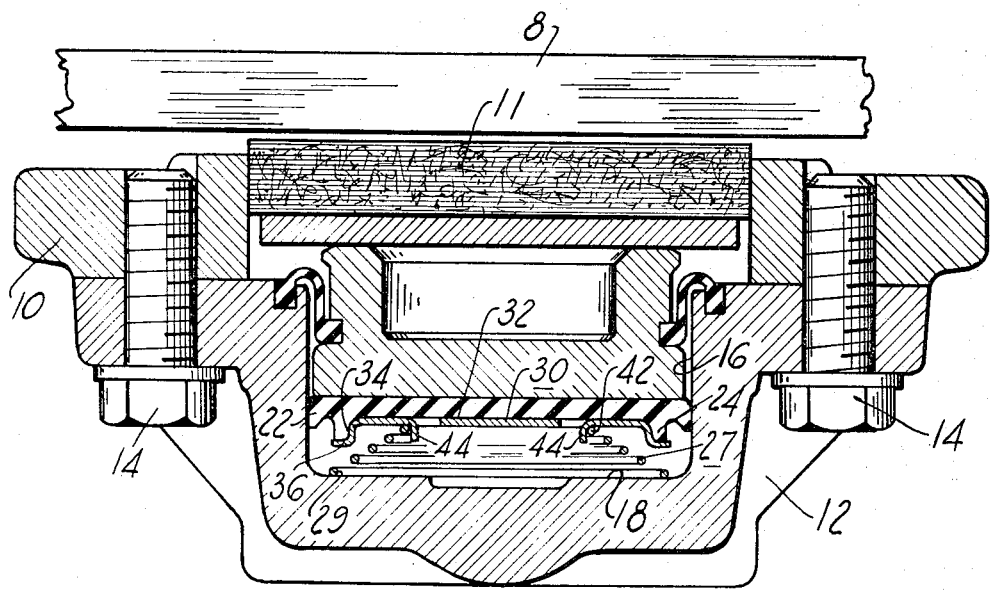
FIGURE 3 is a cross section view illustrating a piston, cup seal relationship wherein a retainer member is inserted in the cup seal.
Figure 4:
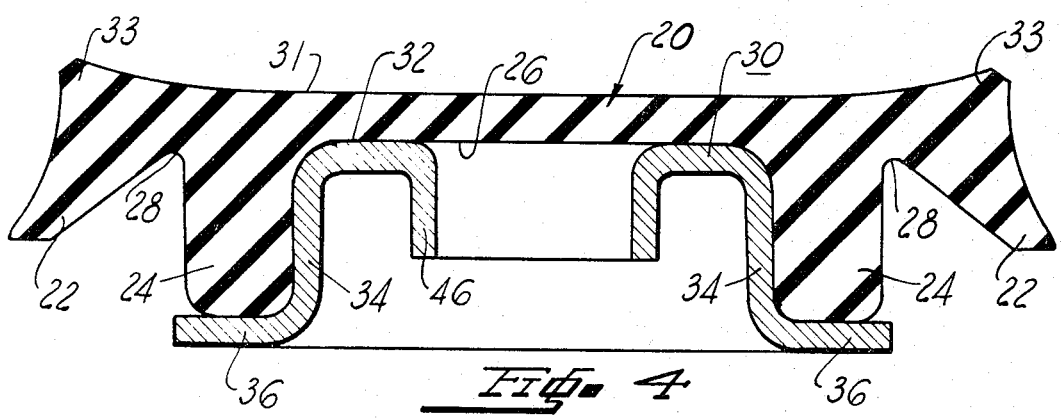
FIGURE 4 is a view of a cup seal and retainer member assembly in its relaxed form.

A simple and inexpensive solution to this problem is illustrated in FIGURES 3 and 4 wherein a retainer member 30 is inserted in the cup seal 20 to prevent bowing of the seal. The retainer member 30 has a flat face 32 engaging the rear face 26 of the cup seal 20, an annular flange 34 extending rearwardly from the flat portion 32 and engaging the inner surface of the annular abutment ring 24, and a transverse annular flange 36 which extends over the end edge of the abutment ring 24. A plurality of tabs 44 extend rearwardly from the flat portion 32 of the retainer member 30 and are arranged on a diameter about the axis of the piston 19 and the retainer member. This diameter is slightly less than the inner diameter of the coil 42 of spring 27 which surrounds the tabs 44 and is retained thereby in a centralized position about the axis of the piston 19. A tubular portion may be substituted for the tabs 44 as shown by the rearwardly extending tubular portion 46 in FIGURE 4.

Figure 2:
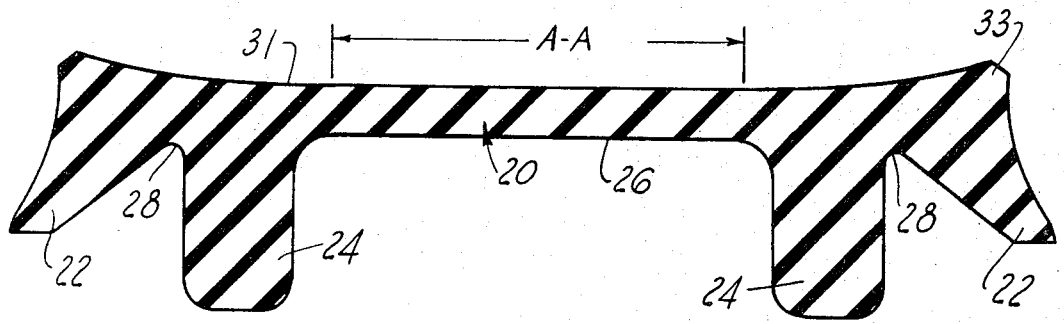
FIGURE 2 is a view of a cup seal in its relaxed form.

FIGURE 2 illustrates the cup seal 22 in its relaxed position and FIGURE 4 illustrates the cup seal 22 and retainer member 30 assembly in its relaxed position. Note that the relaxed shape of the cup seal is the same in both figures. This is due to the fact that there is only a slight interference fit between the flange 34 and the ring 24. When the cup seal, without the retainer member, is located in the cylinder bore 16, the lip 22 and the annular abutment ring 24 are forced radially inwards about points lying on a circumference having a diameter A—A. However, when the retainer member 30 is used, the annular portion 34 thereof acts as a reinforcement member resisting bending of the lip 22 and the annular abutment ring 24 about points lying on a circumference having a diameter A—A, thereby preventing buckling of the central portion of the cup seal 20. The front face 31 of the seal is curved forward at the heel 33 in order that the heel 33 will bend into the wall of the bore 16 and fully engage the same when lip 22 is forced radially inwards. Referring to FIGURE 3, it can be seen that when the cup seal 22 is provided with the retainer 30, the front face of the cup seal is substantially flat when inserted in the bore 16 and is flush with the rear face of the piston 19. The use of the retainer member results in a very slight increase in radial outward pressure effected on the lip seal 22 against the wall of the bore 16 since the retainer does not directly engage the lip 22 and there is only a slight interference fit between the flange 34 and the annular ring 24.

If the piston 19 and cup seal 20, retainer member 30 assembly is used in an environment not requiring the abutment ring 24 acting as a stop, the abutment ring would still be retained for the retainer member to bear thereon rather than on the lip 22, but the ring 24 would not have to project rearwardly beyond the lip 22. It should also be understood that instead of an annular ring 24, a plurality of projecting portions located on the same diameter as the annular ring 24 may be utilized.

From the above, it can be appreciated that the above objects are achieved by the invention disclosed herein.

While the seal has been described with reference to a disc brake actuator, obviously it could be used in any type of fluid motor. It is my intention to include within the scope of the following claims all equivalent applications of the invention whereby the same or substantially the same results may be obtained.

I claim:

1. A resilient cup seal for a fluid motor comprising: a front face of a given diameter, said front face being generally flat in a central portion thereof within the confines of an annular abutment means projecting rearwardly from a rear face of said seal a predetermined distance and having a peripheral ring curved forward, a rearwardly extending annular peripheral lip, the rear portion of said peripheral lip projecting rearwardly a distance less than the predetermined distance of the projection of said annular abutment means and the front portion of said lip conforming to the contour of the peripheral ring curving forward from the generally flat central portion which rear portion and front portion are integral with said peripheral ring.

2. A resilient cup seal in accordance with claim 1 and further comprising a retainer member operatively connected to the generally flat central portion of said seal within said annular abutment means, said retainer member having an annular portion reinforcing said abutment means to resist buckling of said seal tending to upset said generally flat central portion.

3. A resilient cup seal in accordance with claim 2 wherein said retainer member also comprises a transverse annular flange affixed with said annular portion to underlie said abutment means.

References Cited

UNITED STATES PATENTS

| | | | |
|---|---|---|---|
| 1,429,036 | 9/1922 | Iftiger | 92—240 X |
| 1,715,406 | 6/1929 | Christenson. | |
| 2,106,484 | 1/1938 | Hewitt | 92—75 X |
| 2,196,995 | 4/1940 | La Brie | 92—75 |
| 2,261,962 | 11/1941 | Christenson | 92—245 |
| 2,686,403 | 8/1954 | Samuel | 92—135 X |
| 2,754,164 | 7/1956 | Schwarz | 92—245 |
| 2,992,870 | 7/1961 | Carlson et al. | 92—245 |
| 3,008,781 | 11/1961 | Milster | 92—245 |
| 3,064,430 | 11/1962 | Reynolds | 92—75 |

MARTIN P. SCHWADRON, *Primary Examiner.*

I. C. COHEN, *Assistant Examiner.*